United States Patent [19]

Haupt

[11] Patent Number: 5,106,114

[45] Date of Patent: Apr. 21, 1992

[54] MULTIPLE REAR BUMPER HITCH APPARATUS

[76] Inventor: Edward Haupt, 611½ Sixth St., Trafford, Pa. 15085

[21] Appl. No.: 640,848

[22] Filed: Jan. 14, 1991

[51] Int. Cl.⁵ ............................................. B62D 1/06
[52] U.S. Cl. .................................. 280/416.1; 280/504; 280/511
[58] Field of Search ................... 280/416.1, 416.3, 504, 280/511

[56] References Cited

U.S. PATENT DOCUMENTS 2,827,307  3/1958  Osborn .................... 280/416.3
4,456,279  6/1984  Dirck ....................... 280/416.1

Primary Examiner—Mitchell J. Hill
Attorney, Agent, or Firm—H. Keith Hauger

[57] ABSTRACT

A multiple hitch apparatus consisting of a drawbar plate and rotating plate mounted thereon, designed to accommodate various sized hitch balls, a pintle hook and an auxiliary hitching apparatus for connecting a motor vehicle to a load. This multiple hitch apparatus may be used with a variety of trucks and motor vehicles to connect most trailers and other types of loads currently in existence. The pintle hook makes this multiple hitch apparatus applicable to heavier industrial and commercial loads.

5 Claims, 2 Drawing Sheets

MULTIPLE REAR BUMPER HITCH APPARATUS

BACKGROUND OF THE INVENTION

1. Field of the Invention

This invention relates to a multiple rear bumper hitch apparatus for use on trucks, tractors, and various motor vehicles. A variety of hitching means are mounted to a rotating plate, including a variety of hitch balls, a pintle hook and an auxiliary hitching means.

2. Description of the Prior Art

There has been an emergence of different trailers and equipment that are capable of being towed behind a motor vehicle. Therefore, as a result of this trend, a demand has developed for a variety of hitching means and a special demand exists for a multiple hitching means that does not require removal of same for different types of hitching devices. Development in this art has been limited primarily to trailer hitches containing at the most two hitch balls.

U.S. Pat. No. 2,827,307 to Osborn represents an original concept using cleats for holding the hitch in a selected position. A second type of multiple hitch apparatus is shown in U.S. Pat. No. 2,911,233 to Riddle. It has been noted in U.S. Pat. No. 4,456,279 to Dirck that the disadvantages of Riddle "are many weak points in the construction, such as at the juncture between the upstanding sleeve and the brackets securing the device to a vehicle, and the relatively great loads or stresses placed on a hitch of this type causes a failure of the device at these weak points. . ."Likewise, Dirck has disadvantages including its inability to accommodate more than two hitch balls at a time due to the small plate diameter. An advantage of the rotating plate shown in the present application is that it extends beyond the bumper to allow the hitch mechanisms to clear same.

Other concepts are shown in U.S. Pats. to Rocksvold No. 4,022.490, Milton No. 4,232,877 and Trenstra No. 4,729,571.

SUMMARY OF THE INVENTION

It is, therefore, an object of the present invention to provide a multiple hitch apparatus capable of connecting a variety of trucks, tractors and motor vehicles to an equal variety of trailers and loads.

It is the further object of this invention to accomplish the above-stated objective through use of at least three different-sized hitch balls.

It is the further object of this invention to make a multiple hitch apparatus capable of handling heavier loads normally encountered in industrial uses through use of the pintle hook.

It is the further object of this invention to make a hitch means that is readily interchanged by merely rotating a revolving plate to select the appropriate hitch.

It is the further object of this invention to provide capability of hitching to motor homes either through the standard hitch balls and/or pintle hook or through an auxiliary hitch means located under the multiple hitch apparatus.

It is the further object of this invention to offer a multiple hitch apparatus that has higher strength than previous multiple hitches and at the same time is safer to use.

It is the further object of this invention to provide a multiple hitch apparatus that is versatile and reduces the need to interchange hitch devices.

More specifically, the present invention is a multiple hitch apparatus for mounting to motor vehicles comprising a static drawbar plate connected by a fastening means to said motor vehicle at a first end of said drawbar plate and connecting said motor vehicle to a load at a second end of said drawbar plate; a rotating plate having a lower rotating plate surface resting on an upper drawbar plate surface of said drawbar plate; a pivot means connecting said drawbar plate to said rotating plate by extending a pivot bolt means through a pivot means bore located in said drawbar plate and a complimentary pivot means bore located in said rotating plate allowing said rotating plate to revolve in a horizontal plane; a plurality of hitch balls being of various sizes circumferentially fastened to an upper rotating plate surface and capable of accommodating said load equipped with a variety of connecting means; an attachment means for fastening a pintle hook to said rotating plate capable of accommodating said load equipped with pintle-type connecting means; a release pin means for securing said rotating plate in a given position.

These objects, as well as other objects and advantages of the present invention, will become apparent from the following description, in reference to the illustrations appended hereto.

BRIEF DESCRIPTION OF THE DRAWINGS

For a better understanding of the invention, reference may be had to the accompanying drawings, in which.

DESCRIPTION OF THE PREFERRED EMBODIMENTS

Figure 1:
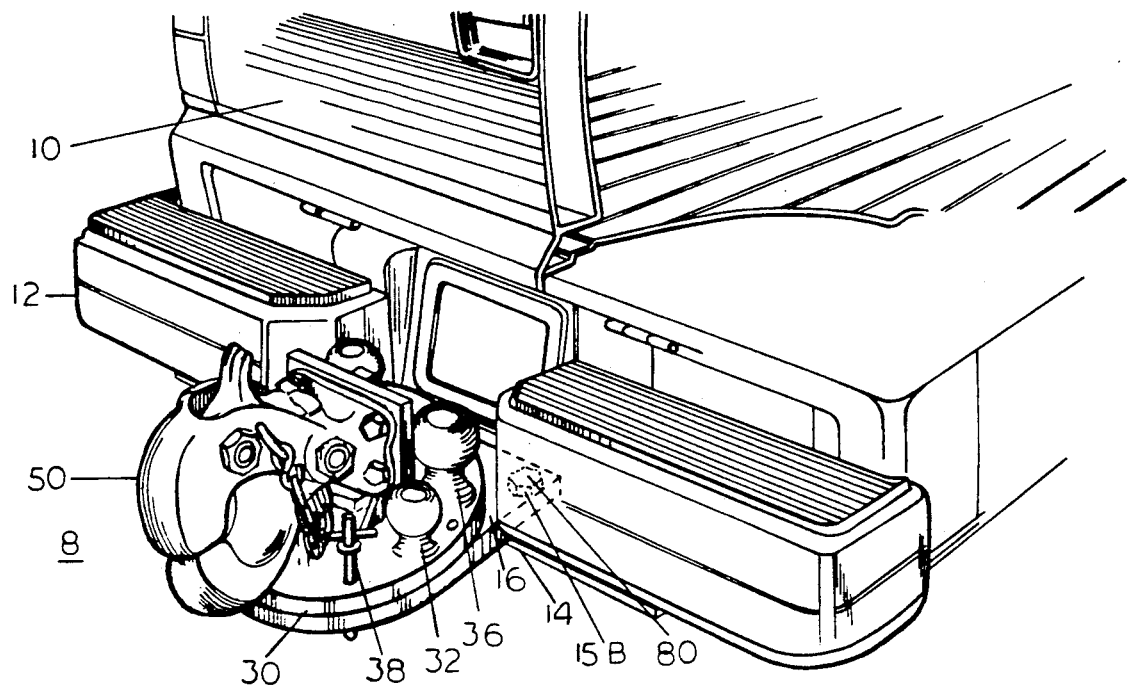
FIG. 1 is a perspective view of a multiple itch apparatus attached to the rear bumper of a motor vehicle being a pick-up truck.

Referring to the drawings, FIG. 1 is a perspective view of a multiple hitch apparatus 8 fastened to a motor vehicle 10 on a motor vehicle bumper drawbar plate 14 which is part of a motor vehicle bumper 12. Drawbar plate 16 has upper drawbar surface 17a whereon rotating plate 30 rests and lower drawbar plate surface 17b which contacts motor vehicle bumper drawbar plate 14 at drawbar plate first end 20a. Drawbar plate first end 20a is opposite drawbar plate second end 20b which is closest to the trailer, mobile home, industrial equipment or other load which is connected to said multiple hitch apparatus. Drawbar plate fastening means 80 is received by bumper drawbar plate bores 15b and likewise an opposite bumper drawbar plate bore not shown 15a, and complimentary drawbar plate bores 18a and 18b.

Drawbar plate fastening means 80 functions to secure multiple hitch apparatus 8 firmly to motor vehicle bumper 12.

Figure 4:
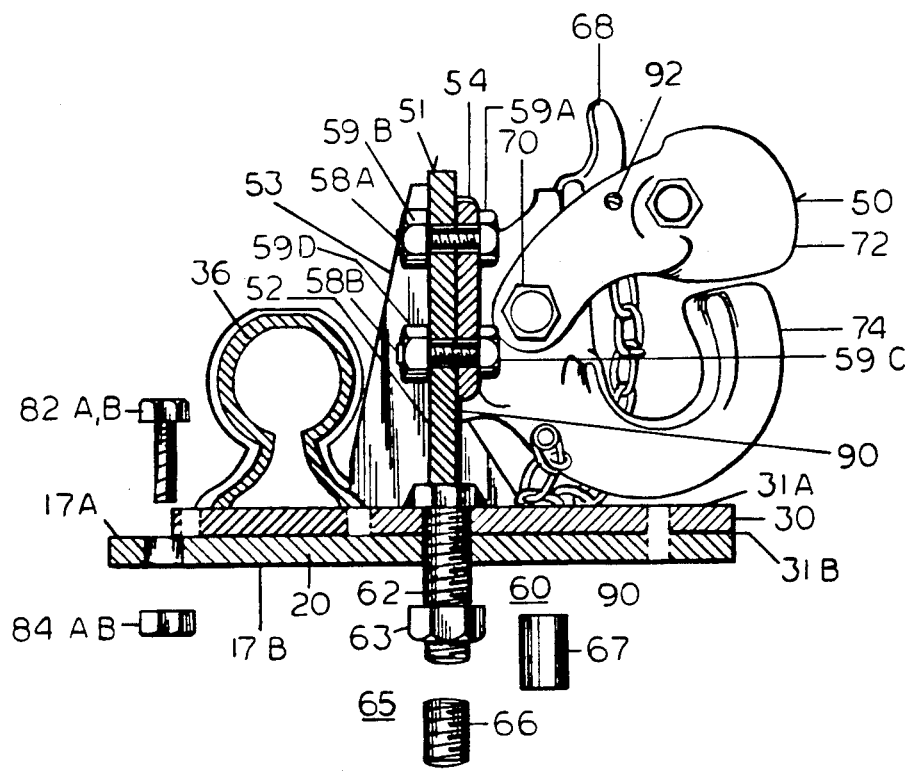
FIG. 4 is a cross-sectional view of the multiple hitch apparatus taken along line A—A of FIGS. 2 and 3 when the rotating plate would be positioned and placed over the drawbar plate as shown in FIG. 1.
Figure 2:
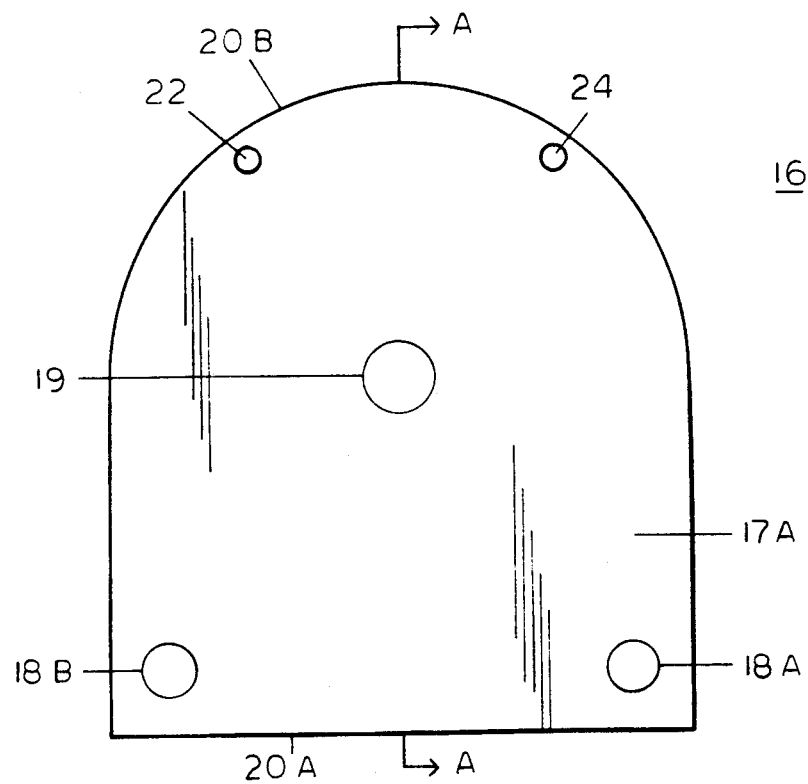
FIG. 2 represents a top elevation view of a drawbar plate.
Figure 3:
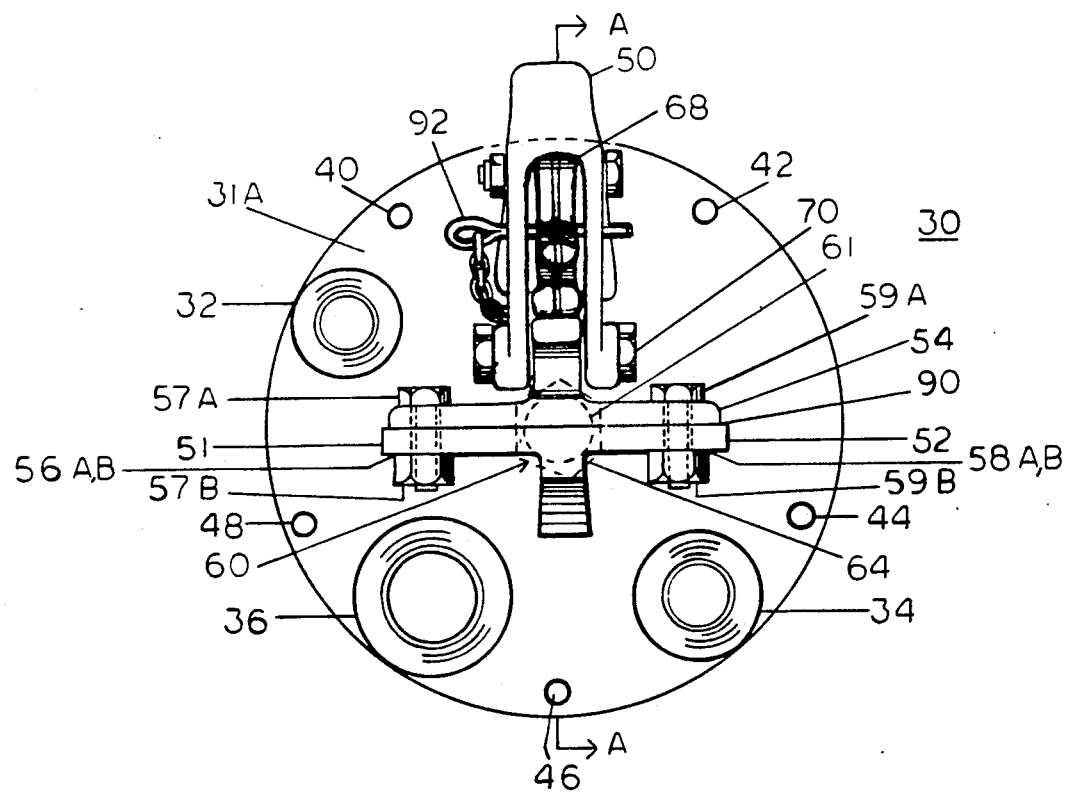
FIG. 3 is a top elevation view of a rotating plate with attached hitch balls and pintle hook.

Rotating plate 30 consists of lower rotating plate surface 31b which contacts upper drawbar plate surface 17a. Hitch balls 32, 34 and 36 and pintle hook 50 are fastened to upper rotating plate surface 31a. Hitch balls 32, 34 and 36 and pintle hook 50 are shown in FIGS. 1, 3 and 4 as being fastened by welding, but may also be fastened by threaded shafts allowing hitch balls 32, 34 and 36 to be readily interchanged with other sizes.

Rotating plate 30 is held in position relevant to drawbar plate 16 by preferably two release pins like release pin 38 shown in FIG. 1. Release pin 38 extends through one of rotating plate quick release pin bores 40, 42, 44, 46, or 48 and one complimentary drawbar quick release pin bore 22 or 24.

Release pin 38 is readily removed to allow rotating plate 30 to revolve for alternate selection from hitch ball 32, 34, 36, and pintle hook 50 for proper alignment to the given trailer, mobile home, industrial equipment or other load.

Pintle hook 50 generally has a higher load rating than other types of hitches and has many commercial applications. Pintle hook 50 is fastened preferably by welding to upper rotating plate surface 31a by pintle hook structural support means 51 consisting of main vertical support plate 52 and perpendicular thereto vertical back support plate 53 which function to provide sufficient strength to counter load forces. Pintle hook 50 consists of pintle hook vertical mounting plate 54 which contacts pintle hook structural support 51 frontal attachment means surface 90 and is secured by pintle hook fastening means 56a, 56b, 58a and 58b. Pintle hook fastening means 58a and 58b further consist of bolt 59a, complimentary nut 59b, bolt 59c and complimentary nut 59d respectively. Likewise, pintle hook fastening means 56a and 56b consist of a bolt and nut means which is partially shown in FIG. 3 where bolt 57a and complimentary nut 57b are indicated as pintle hook fastening means 56a. Pintle hook 50 further consists of pintle hook latch means 68 which allows pintle hook upper jaw 72 to lock securely to pintle hook lower jaw 74. Pintle hook upper jaw 72 rotates about pintle hook pivot means 70 and is further secured from accidentally popping while in use through locking pin means 92 pintle hook pivot means 70 functions to allow pintle hook upper jaw 72 to open or close quickly and efficiently for connecting or disengaging a designated load.

Release pin 38 is readily removed to allow rotating plate 30 to revolve for alternate selection from hitch ball 32, 34, 36, and pintle hook 50 for proper alignment to the given trailer, mobile home, industrial equipment or other load. Pivot means 60 consists of pivot bolt means 62 and threaded pivot stationary nut means 64 which is welded to upper rotating plate surface 31a as shown in FIG. 4. Stationery nut means 64 functions to make all parts of multiple hitch apparatus 8 located above rotating plate 30 an integral piece. Pivot bolt means 62 extends vertically through drawbar plate pivot bore 19 and complimentary pivot means bore 61 allowing multiple hitch apparatus 8 to be fastened together by tightening pivot locking nut means 63.

Auxiliary hitching means 65 is located at lower drawbar plate surface 17b and consists of an inner threaded sleeve means 67 for fastening to an extended end of pivot bolt means 62 and to the all thread shaft 66 at an opposite end of threaded sleeve means 67. Auxiliary hitching means 65 may be used for connecting to a variety of loads, but is particularly suitable for motor homes.

Drawbar right bolt 82a and drawbar left bolt 82b extend through complimentary drawbar plate bores 18a and 18b and bumper drawbar plate bores 15a (not shown but opposite 15b) and 15b respectively and are secured by drawbar right lock nut 84a and drawbar left lock nut 84b.

In accordance with the provisions of the patent statutes, I have explained the principle and operation of my invention and have illustrated and described what I consider to represent the best embodiment thereof.

I claim:

1. A multiple hitch apparatus for mounting motor vehicles comprising:
    a static drawbar plate connected by a fastening means to said motor vehicle at a first end of said drawbar plate and connecting said motor vehicle to a load at a second end of said drawbar plate;
    a rotating plate having a lower rotating surface resting on an upper drawbar plate surface of said drawbar plate;
    a plurality of hitch balls being of various sizes circumferentially fastened to an upper rotating plate surface and capable of accommodating said load equipped with a variety of connecting means;
    a structural support means for fastening a pintle hook to said rotating plate capable of accommodating said load equipped with pintle-type connecting means;
    a pivot means connecting said drawbar plate to said rotating plate by extending a pivot bolt means through a pivot means bore located in said drawbar plate and a complimentary pivot means bore located in said rotating plate allowing said rotating plate to revolve in a horizontal plane clockwise or counter clockwise for selection alternately from said hitch balls and said pintle hook for alignment to said load;
    a release pin means for securing said rotating plate in a given position consisting of a plurality of release pins for insertion into a plurality of complimentary release pin bores coordinately situate in said rotating plate and said drawbar plate.

2. A multiple hitch apparatus according to claim 1, wherein:
    said pivot bolt means further consists of a head secured to said upper rotating plate surface and a threaded shaft extending vertically downward through said rotating plate bore and said drawbar plate bore allowing a length of said threaded shaft to extend beyond a lower drawbar plate surface.

3. A multiple hitch apparatus for mounting to motor vehicles comprising:
    a static drawbar plate connected by a fastening means to said motor vehicle at a first end of said drawbar plate and connecting said motor vehicle to a load at a second end of said drawbar plate;
    a rotating plate having a lower rotating plate surface resting on an upper drawbar plate surface of said drawbar plate;
    a plurality of hitch balls being of various sizes circumferentially fastened to an upper rotating plate surface and capable of accommodating said load equipped with a variety of connecting means;
    a structural support means for fastening a pintle hook to said rotating plate capable of accommodating said load equipped with a pintle-type connecting means wherein said structural support means consisting of a main vertical support plate fastened to said upper rotating plate surface, a vertical back support plate perpendicular to said main vertical support plate and fastened to said upper rotating plate surface and said main vertical support rotating plate surface and said main vertical support plate, a pintle hook fastening means for connecting said structural support means at a frontal attachment means surface to a pintle hook vertical mounting plate;

a pivot means connecting said drawbar plate to rotating plate by extending a pivot bolt means through a pivot means bore located in said drawbar plate and a complimentary pivot means bore located in said rotating plate allowing said rotating plate to revolve in a horizontal plane clockwise or counter clockwise for selection alternately from said hitch balls and said pintle hook for alignment to said load wherein said pivot bolt means further consists of a head secured to said upper rotating plate surface and a threaded shaft extending vertically downward through a rotating plate bore and a drawbar plate bore allowing a length of said threaded shaft to extend beyond a lower drawbar plate surface;

a release pin means for securing said rotating plate in a given position consisting of a plurality of release pins for insertion into a plurality of complimentary release pin bores coordinately situate in said rotating plate and said drawbar plate;

an auxiliary hitching means for extending from said lower drawbar plate surface for connecting said motor vehicle to motor homes and the like consisting of an all-thread shaft and inner threaded sleeve means for fastening to said pivot bolt means.

4. A multiple hitch apparatus according to claim 3, wherein:
said fastening means consists of a plurality of drawbar bolt means which extend through a plurality of drawbar bores and complimentary motor vehicle bumper bores, said plurality of drawbar bolt means secured by an equal plurality of locking nut means.

5. A multiple hitch apparatus for mounting motor vehicles comprising:
a static drawbar plate connected by a fastening means to said motor vehicle at a first end of said drawbar plate and connecting said motor vehicle to a load at a second end of said drawbar plate;

a rotating plate having a lower rotating surface resting on an upper drawbar plate surface of said drawbar plate;

a plurality of hitch balls being of various sizes circumferentially fastened to an upper rotating plate surface capable of accommodating said load equipped with a variety of connecting means;

a structural support means for fastening a pintle hook to said rotating plate capable of accommodating said load equipped with pintle-type connecting means;

a pivot means connecting said drawbar plate to said rotating plate by extending a pivot bolt means through a pivot means bore located in said drawbar plate and a complimentary pivot means bore located in said rotating plate allowing said rotating plate to revolve in a horizontal plane clockwise or counter clockwise for selection alternately from said hitch balls and said pintle hook for alignment to said load;

a release pin means for securing said rotating plate in a given position consisting of a plurality of release pins for insertion into a plurality of complimentary release pin bores coordinately situate in said rotating plate and said drawbar plate;

wherein said pivot bolt means further consists of a head secured to said upper rotating plate surface and a threaded shaft extending vertically downward through said rotating plate bore and said drawbar plate bore allowing a length of said threaded shaft to extend beyond a lower drawbar plate surface; and wherein said structural support means consists of a main vertical support plate fastened to said upper rotating plate surface, a vertical back support plate perpendicular to said main vertical support plate and fastened to said upper rotating plate surface and said main vertical support plate, a pintle hook fastening means for connecting said structural support means at a frontal structural support means surface to a pintle hook vertical mounting plate.

* * * * *